United States Patent [19] [11] 3,735,150
Harris [45] May 22, 1973

[54] LOW NOISE PHASE DETECTOR

[75] Inventor: Robert W. Harris, Temple Hills, Md.

[73] Assignee: The United States of America as represented by the Secretary of the Navy, Washington, D.C.

[22] Filed: Dec. 21, 1971

[21] Appl. No.: 210,349

[52] U.S. Cl.................307/232, 328/109, 330/30 D, 328/133, 307/235
[51] Int. Cl. ................................................H03k 5/20
[58] Field of Search..............................307/232, 235; 328/109, 110, 133; 330/30 D

[56] References Cited

UNITED STATES PATENTS 3,519,841 7/1970 Leinfelder............................307/232
3,597,636 8/1971 Krauchenko.....................328/110 X
3,641,443 2/1972 Zerby................................307/232 X
3,657,659 4/1972 Johnson ...............................328/133

Primary Examiner—John S. Heyman
Attorney—R. S. Sciascia, Arthur L. Branning and Philip Schneider

[57] ABSTRACT

A phase sensitive detector employing a pair of limiting amplifiers, wherein the outputs are respectively connected to a current switch and a pair of in-line-decision switches. The in-line-decision switches and the current switch provide a current on one of two lines that is indicative of a phase difference between two periodic waveforms as they appear on the input of the limiting amplifier. The switching properties are controlled as a function of each waveforms' zero-crossover point in time. This circuit measures phase difference with high accuracy and resolution and with minimal degradation of the accuracy when measuring weak or noisy signals as a result of employing all zero cross-overs.

5 Claims, 7 Drawing Figures

Patented May 22, 1973

INVENTOR
ROBERT W. HARRIS

BY

ATTORNEY

Patented May 22, 1973 3,735,150
4 Sheets-Sheet 2
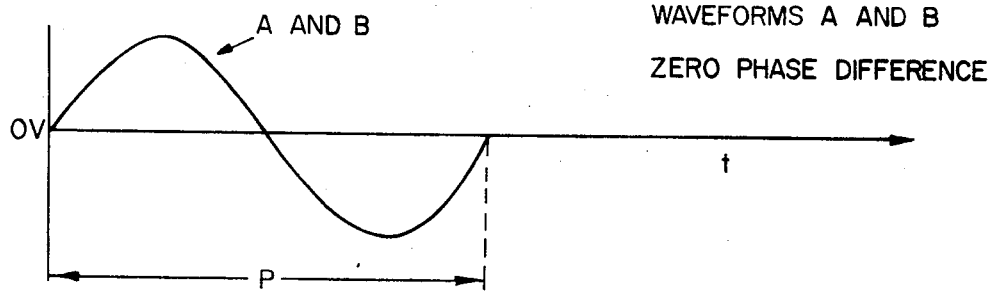
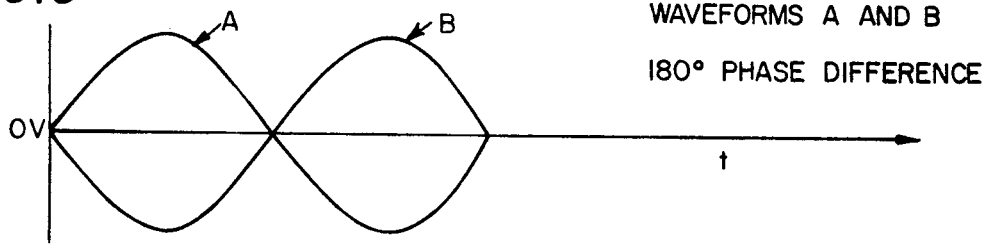
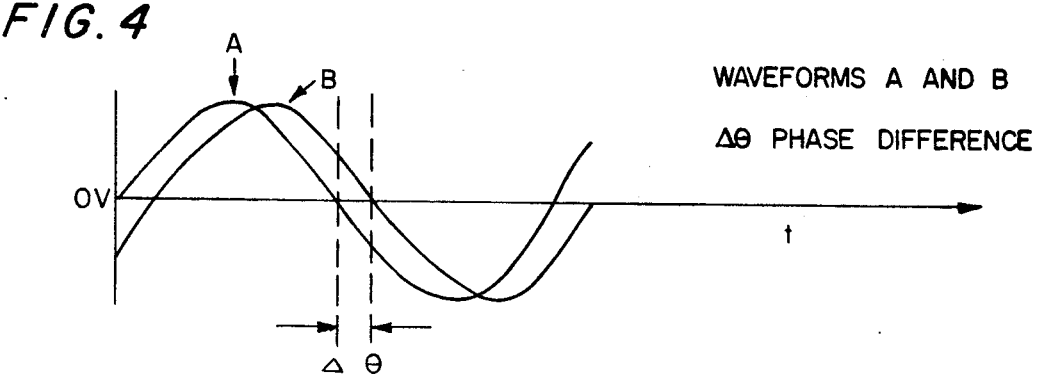
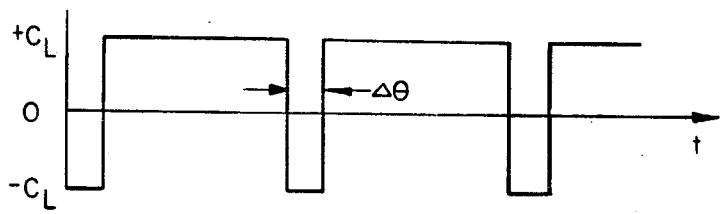
INVENTOR
ROBERT W. HARRIS
BY
ATTORNEY

INVENTOR
ROBERT W. HARRIS

ATTORNEY

LOW NOISE PHASE DETECTOR

BACKGROUND OF THE INVENTION

A phase detector circuit is a useful means for providing an output proportional to a phase difference of two periodic signals as the signals are applied to a pair of inputs. Phase detectors have a wide application in the measurement of modulation, mixing, and gating functions, and depending upon the particular use, some require accuracy of 0.1°. However, such an accuracy has been difficult to obtain when given two weak or noisy input signals.

Most phase sensitive circuitry employ a zero-crossing-detector (ZCD) to sense the respective times that each of the periodic waveforms cross over zero volts. The time between each of the respective zero-cross-overs is used as a relative timing information and in turn is made to correspond to the phase relationship. However, the ZCD phase detecting schemes of the prior art have serious disadvantages. The most prevalent disadvantageous condition is that only a fraction of the zero-cross-overs are employed. For example, it is commom to find a phase meter which senses only the positive going cross-overs of the respective waveforms and ignores the negative going cross-overs. This type of system wastes information since it detects only one half of the available information, and the presence of noise sometimes causes random errors in the timing of the zero cross-overs. Hence the measurement of noisy or weak input signals, displaying a small phase difference, has been difficult.

SUMMARY OF THE INVENTION

Two periodic signals of a similar frequency are respectively applied to two limiting amplifiers, to limit and shape each signals. The two limiting amplifiers produce signals of a common amplitude and maintain the phase relationship consonant with that of their respective inputs. One of the two limited and shaped signals is applied to a current switch, and depending upon the polarity (i.e., greater or less than zero) of the signal, the current is switched to either one of two in-line-decision switches.

The other signal is applied to each of the in-line-decision switches, and depending on the polarity of the applied signal, the in-line decision switch further directs the current presented thereto.

Thus four current paths are obtainable, and each path represents a different combination of the polarities of the two signal inputs. The four current paths are then combined into two lines and are differentially amplified in a manner such that a square wave is produced as a result of the switching action. Thus, the square wave has a duty factor proportional to the phase difference of the two input signals.

The square wave is then applied to a precision limiting amplifier and finally to a low pass filter. Thus, a voltage, which is linearly dependent upon the original phase difference, is produced from the output of the low pass filter.

The output may be applied to a number of phase sensitive circuitry.

OBJECTS OF THE INVENTION

It is an object of the present invention to accurately measure phase differences between two periodic signals of substantially the same frequency.

Another object of the invention is to accurately measure the phase difference between the two periodic signals when a considerable amount of wideband noise is present on either one or both the input signals.

A further object of the invention is to provide a device having good noise rejection properties which will quickly respond to a true change in phase.

Other objects of this invention will become readily apparent to those skilled in the art after an understanding of the specification and the following drawings wherein like parts are similarly labeled throughout.

BRIEF DESCRIPTION OF THE DRAWINGS

FIG. 2 is a showing of two waveforms in phase, as applied to the inputs of the device;

FIG. 3 depicts two waveforms 180° out of phase, as applied to the inputs of the device;

FIG. 4 is a diagram of two waveforms displaying a phase difference of $\theta$.

FIG. 6 is a showing of a waveform representing the output of the device prior to being filtered for a phase difference of $\theta$.

DETAILED DESCRIPTION

Figure 1:
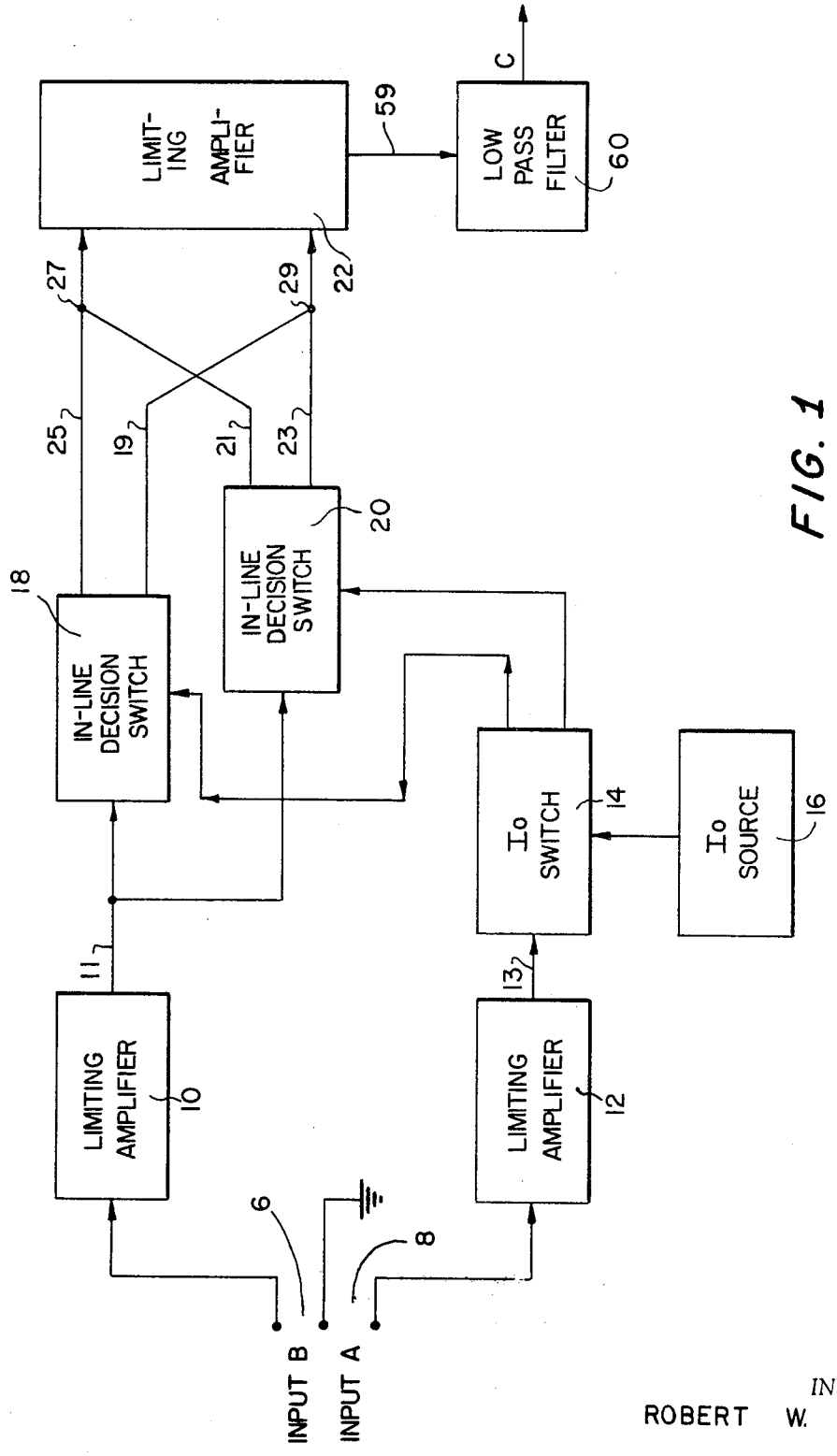
FIG. 1 is a block diagram showing the major functions of this invention.

Referring to FIG. 1, two periodic waveforms, of a similar frequency, are respectively applied to inputs 6 and 8. Each waveform is then applied to its respective limiting amplifier 10 and 12. The outputs 11 and 13 of the limiting amplifiers provide a "squared-up" clipped signal resembling a square wave. The waveforms at terminals 6 and 8 can be different in amplitude since the outputs 11 and 13 provide an output clipped to a similar amplitude. Each "squared-up" signal 11 and 13 is in phase with its respective input.

Considering waveform A, its "squared-up" signal 13 is applied to $I_o$ switch 14, which switches $I_o$ from source 16 to either in-line decision switch 20 or 18. When periodic waveform A is greater than zero volts, $I_o$ is switched to in-line decision switch 20. When the periodic waveform A is less than zero volts, $I_o$ is presented to inline-decision switch 18. Thus, throughout a period of waveform A each of the in-line-decision switches 18 and 20 receive $I_o$ for half the period.

When $I_o$ is presented to in-line-decision switch 20, it is then applied to either line 21 or line 23 depending on the polarity of waveform B. Similarly, if $I_o$ is presented to in-line-decision switch 18, it is then applied to either lines 19 or 25. However when $I_o$ is presented to in-line-decision switch 20, it will be transferred to line 21 when waveform B is experiencing a value greater than zero and $I_o$ will be transferred to line 23 when waveform B is less than zero.

Similarly, if $I_o$ is presented to in-line-decision switch 18, it will be transferred to line 19 when waveform B is experiencing a value greater than zero volts and will be transferred to line 25 when waveform B is less than zero.

Since $I_o$ is presented to the switches 18 and 20 in a manner consonant with the polarity of input waveform A, the four possible $I_o$ outputs of the two in-line-decision switches can be summarized.

When:

$$A\ 0\ \text{and}\ B\ 0 = I_o \text{ on line } 23 \quad (1)$$

$$A\ 0\ \text{and}\ B\ 0 = I_o \text{ on line } 21 \quad (2)$$

$$A\ 0\ \text{and}\ B\ 00 = I_o \text{ on line } 25 \quad (3)$$

$$A\ 0\ \text{and}\ B\ 0 = I_o \text{ on line } 19 \quad (4)$$

Since line 25 is connected to line 21 at point 27 equations (2) and (3) become:
[A 0 and B 0] or [A 0 and B 0] = $I_o$ at point 27. (5)

Similarly, line 19 is connected to line 23 at point 29 equations (1) and (4) become:
[A 0 and B 0] or [A 0 and B 0] = $I_o$ at point 29. (6)

Limiting amplifier 22 supplies a positive value of current on line 59 when $I_o$ enters from point 27, but provides a negative value of current when $I_o$ enters from point 29. As will be subsequently shown, this change in current from one value to another, and the amount of time the current remains at one particular value, corresponds to the phase difference between input A and input B.

Referring to FIG. 2, when no phase difference exists between the waveforms A and B throughout the period P, their respective cross-overs occur simultaneously and both waveforms approach zero from the same direction. Thus from equation (5):
[A 0 and B 0] or [A 0 and B 0] = $I_o$ enters at point 27. (7)

As explained above, when $I_o$ enters at point 27, limiting amplifier 22 provides a positive output. Therefore, the absence of a negative current value corresponds to a zero phase difference.

Referring to FIG. 3, a phase differenc of 180° is shown between waveforms A and B. In this case, the zero cross-overs occur simultaneously but the waveforms approach zero from the opposite direction. Thus, from equation (6) the following will always be true:
[A 0 and B 0] or [A 0 and B 0] = $I_o$ enters point 29. (8)

Hence, $I_o$ enters limiting amplifier 22 at point 29 continuously thus producing a constant negative output at point 59, and corresponding to a phase difference of 180°.

FIG. 4 shows the most common situation where waveform A has a slight phase difference with respect to waveform G. Assume, for purposes of example, that waveform A leads waveform B by a phase difference of $\theta$. Where A is in its first positive half-cycle during the period P, $I_o$ is switched from source 16 to in-line-decision switch 20. Also, it should be noted that waveform B is negative until it crosses zero, as shown in FIG. 4, thus line 23 carries $I_o$ for the first half-cycle since:
[A 0 and A 0] = $I_o$ on line 23

[from Equation (1)].

After waveform B crosses zero, $I_o$ is still applied to in-line-decision switch 20 since waveform A continues to be greater than zero but switch 20 now provides an output on line 21 since:
[A 0 and B 0] = $I_o$ on line 21

[from Equation (2)].

When A's positive half-cycle has passed, $I_o$ current switch 14 provides $I_o$ to in-line-decision switch 18. Since waveform B remains greater than zero after waveform A has gone negative, $I_o$ is applied to line 19:
[A O and B O] = $I_o$ on line 19

[from Equation (4)].

Finally, as soon as B crosses zero and becomes less therewith, $I_o$ is applied to line 25 until waveform A equals zero since:
[A O and B O] = $I_o$ on line 25 [from Equation (3)].

Therefore, following the waveforms A and B through one complete period, $I_o$ as applied to limiting amplifier 22, has switched from line 23 to line 21, and then to line 19 and finally to line 25. Since the lines are connected in pairs, the input $I_o$ to the amplifier 22 switches from 29 to line 27 and back to line 29 and finally to line 27.

The switching action of lines 27 and 29 is employed to control limiting amplifier 22. The limiting amplifier provides a carefully maintained current to low pass filter 60. For example, when $I_o$ is switched to line 29, the limiting amplifier 22 drains a current I, from low pass filter assembly 60, but when $I_o$ is switched to line 27, a distinctly different value of current is provided to the low-pass filter 60.

The low pass filter 60 manipulates the two current levels to provide an output voltage which proportionally varies between the two levels such that the amount of time the voltage remains at either level is proportional to the original phase relationship.

Figure 5:
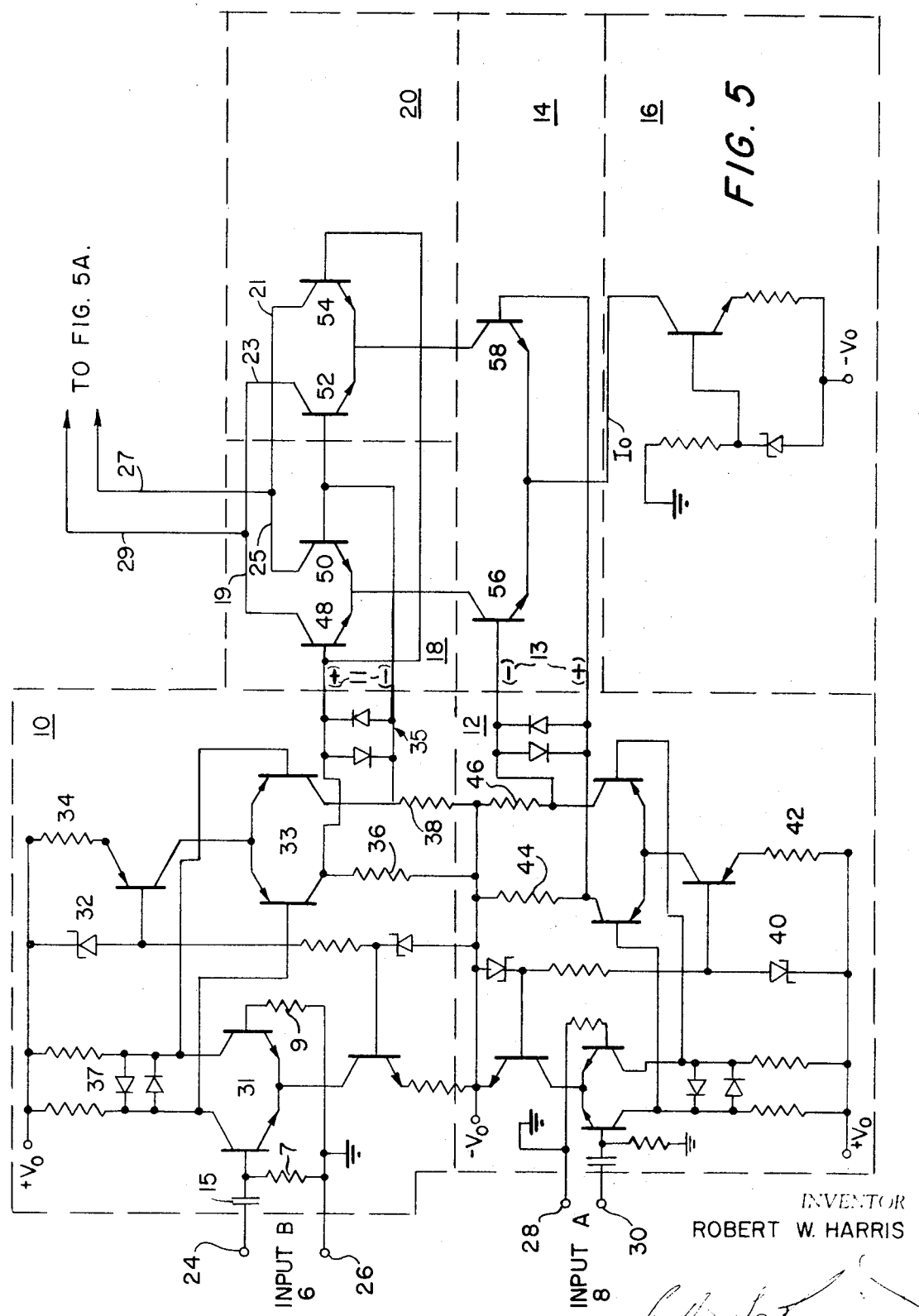
FIGS. 5 and 5A is a detailed schematic diagram of the functions shown in FIG. 1.

Referring to FIG. 5 for a more complete understanding of the circuit, waveform A is applied to input 6. Input 6 consists of terminals 24 and 26. Terminal 26 is provided to ground and terminal 24 controls the transistor pair 31 in either on or off manner. Transistor pair 31 and diode pair 37 form a limiting amplifier with a differential voltage output across diode pair 37. In the presence of a sufficiently strong input signal at the input 6, limiting action occurs in both the transistor pair 31, and in the diode pair 37. In both the diode pair 37, and the transistor pair 31, the limiting that occurs is symmetrical with respect to signal polarity. Therefore for a sinusoidal waveform at input B, the voltage across diode pair 37 will be a symmetrically limited (flattened) waveform which crosses zero at a faster rate, but at the same time as the input waveform. The voltage across diode pair 37 is applied to the bases of transistor pair 33. Transistor pair 33 and diode pair 35 function as a limiter amplifier similarly to transistor pair 31 and diode pair 37. The output of transistor pair 33 and diode pair 35 is considered to be across diode pair 35. The main feature of the limiting amplifier 10 is its characteristic of providing an exceptionally fast rise time on the output 11 regardless of the comparatively slow rise time ususlly received at input 6.

Limiting amplifier 12 operates to provide output 13 in the same manner that was just previously described.

Current source 16 provides constant current $I_o$ to $I_o$ switch 14. $I_o$ switch includes transistors 56 and 58 which are controlled by the input 13. The collector of transistor 56 provides a current path to transistors 48 and 50 in line decision circuit 18. Similarly, the collector of transistor 58 provides a current path to the transistors 52 and 54 in line decision circuit 20. If the voltage difference to input 13 to $I_o$ switch 14 is positive, transistor 58 turns on and provides $I_o$ to transistors 52 and 54. Similarly, if the voltage difference is negative, transistor 56 turns on applying $I_o$ to 48 and 50.

Current $I_o$ is presented to transistors 52 and 54, during the positive portion of the waveform A at input 8, thus, depending on the polarity of input 6 (which is identical to the polarity signal at point 11) either transistor 52 and 54 will turn on. If waveform B is positive, transistor 54 turns on providing $I_o$ on line 21, thus, satisfying previously developed equation (2). If waveform A is negative, $I_o$ is applied to transistors 50 and 48 by way of transistor 56. If waveform B at input 6 is less than zero transistor 50 in the in-line-decision switch 20 will turn on and $I_o$ will be applied to line 25. The operation of 48 and 52 is similar to that described.

Lines 19 and 23 are combined to form terminal 29 of the limiting amplifier 22. Similarly, lines 21 and 25 are combined to form terminal 27.

Figure 5A:
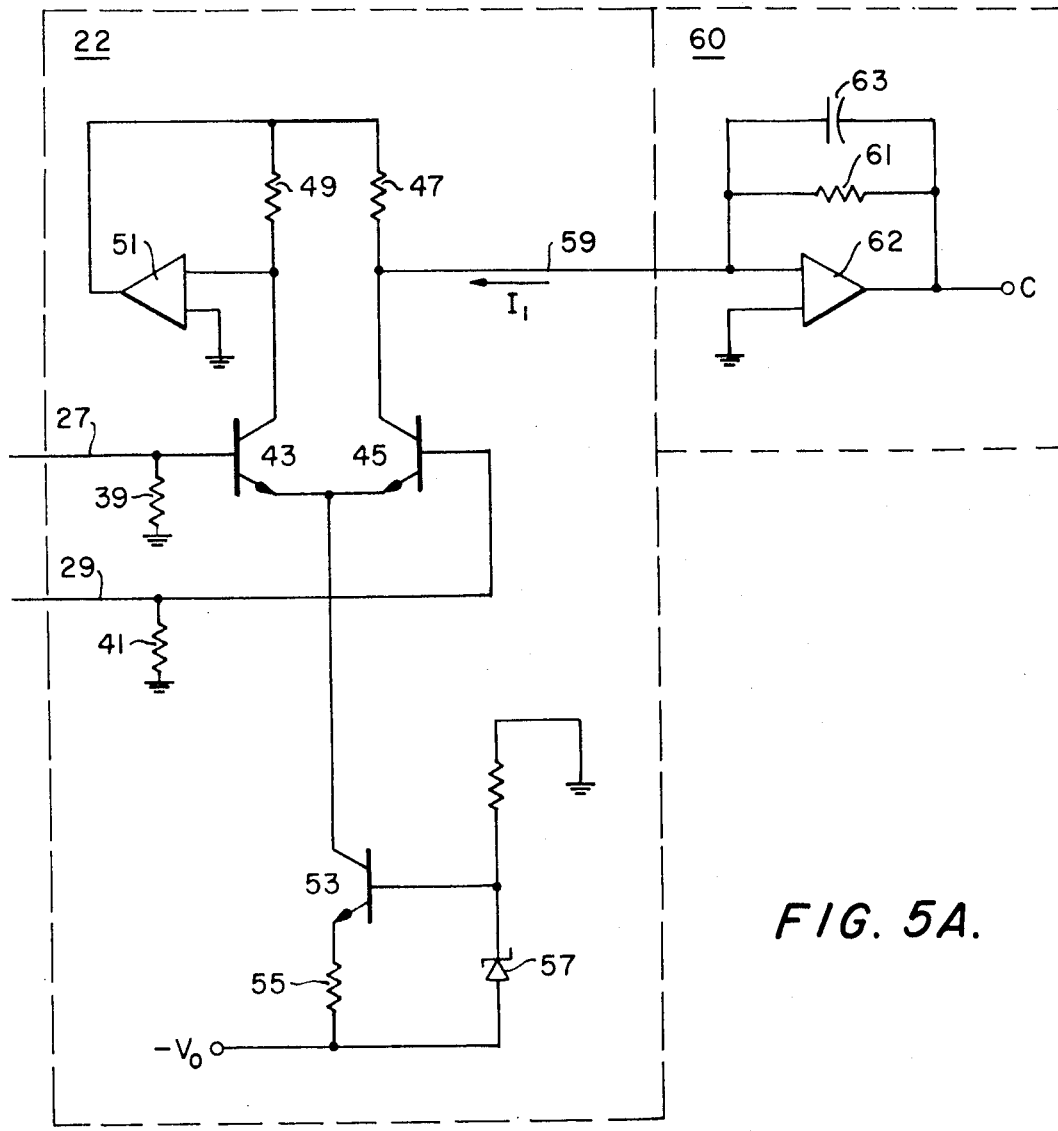

As best can be seen in FIG. 5A, which is an extension of FIG. 5, lines 27 and 29 connect in-line-decision switches 18 and 20 to limiting amplifier 22.

As a result of the switching action between lines 27 and 29, current $I_o$ is either applied to the base of transistor 43 or transistor 45. When current $I_o$ appears on line 27, a voltage is produced as a result of resistor 39. The voltage appearing across resistor 39 forward biases the emitter to base junction of transistor 43 to provide a current path from the collector to the emitter. As explained previously, when a phase difference exists between the inputs of the device, the switching action between lines 27 and 29 produces a current $I_o$ on either line 27 or line 29. Hence, when transistor 43 is off, $I_o$ is applied to resistor 41 to develop the required turn on voltage for transistor 45. The emitters of transistors 43 and 45 are connected together and lead to a constant current source. The constant current source consists of transistor 53, resistor 55 and zener diode 57. Although the current source is typical and well known in the art and would appear to need no explanation, the components should be selected such that the source is capable of drawing a few milliamps.

The combination of operational amplifiers 51 and 62 and resistors 47 and 49 are responsible for a current being drawn through line 59 from low pass filter 60. The current, labeled $I_1$, in FIG. 5A can be drawn at two levels. The particular level depends on which transistor (either 43 or 45) is conducting. When transistor 45 is "on," $I_1$ current flows from the constant current source through ground to operational amplifier 62, through transistor 45 and returns to the current source.

The other current level, which is present while transistor 43 is "on," is of a smaller value and is produced by the operational amplifier 51 in combination with operational amplifier 62. When transistor 43 is "on," a voltage differential is present on the inputs of operational amplifier 51. This differential voltage is amplified and applied to resistors 47 and 49. Both resistors are selected to be of a common value and are coupled to ground through an operational amplifier, the voltages across resistors 47 and 49 are, for all practical purposes, equal. Therefore, the currents through the resistors are equal and a current through resistor 49 and transistor 43 will equal the current through resistor 47. Simple modal analysis shows that an equal amount of current is drawn through line 59. The two levels of current are respectively controlled by transistors 43 and 45 which are switched as a function of the imput waveforms. The amount of time each current level appears on line 59 is of the phase difference between the two input waveforms.

Referring to FIG. 6, a waveform as an output C is shown in relation to FIG. 4. The output C will be in either $\pm$ C for most of the time. It can readily be seen that this output switches from on limit to the other each time either input crosses zero. The average value of the waveform shown in FIG. 6, expressed as $C_A$ is function of the phase difference $\theta$ and can be easily be shown as $$c_A = C_L (1 - \theta/90°)$$

where $C_L$ is the maximum amplitude of $\pm$ C, as determined by limiting amplifier 22 in FIG. 5 and 5A.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A phase detector for measuring a phase difference between two periodic signals of similar frequency comprising:

means for shaping a first and second signal;

means for limiting each of said first and second signals coupled to said shaping means;

means for selectively applying a current of a determined value to one of two current paths as a function of said first signal, said means for selectively applying said current being connected to said limiting means for said first signal;

means for switching said current in said one of two current paths to selected terminals of a limiting amplifier wherein said means for switching said current is connected to said limiting means for said second signal and said switching means being controlled by said second signal;

means for generating a d.c. level proportional to the current applied to one of said selected terminals;

means for providing a voltage output connected to said d.c. level generating means such that a voltage level which is representative of a phase difference between said first and second signal is provided for as a result of said d.c. level.

2. The phase detector is claimed in claim 1, wherein said means for limiting and means for shaping comprises:

a pair of limiting amplifiers adjusted to produce an identical rise time and an identical amplitude for said first and said second signal.

3. The phase detector as claimed in claim 1, wherein said means for selectively applying a current comprises:

a first and second transistor, operated within them saturated mode wherein only said first transistor turns on when said first signal is greater than OV, and only said second transistor turns on when first signal is less than 0 volts.

4. The phase detector as claimed in claim 1, wherein said means for selectively switching said current comprises:

two pairs of transistors, operated within their saturated mode wherein each pair is connected.

5. A phase detector for measuring a phase difference between two periodic signals of similar frequency comprising:
   a first and second limiting amplifier each having an input and an output wherein each input provides means for connecting a first and a second signal;
   the output of said first limiting amplifier connected to a current switch such that when said first signal is greater than a reference a current is switched to a first in-line decision switch and when said first signal is less than said reference said current is switched to a second in-line-decision switch;
   said output of said second limiting amplifier connected to said first and said second in-line-decision switch such that when said second signal is greater than said reference, said current is applied to a first terminal and when said second signal is less than said reference said current is applied to a second terminal;
   a third limiting amplifier means connected to said first and second terminals providing a current output proportional to a current change between said first and second signal,
   a first and a second operational amplifier connected to said third limiting amplifier means to provide a voltage level proportional to said current change between said first and second signal.

* * * * *